United States Patent
Tian et al.

(10) Patent No.: US 9,215,679 B2
(45) Date of Patent: Dec. 15, 2015

(54) AIR-INTERFACE TIMING SYNCHRONIZATION SHARING

(75) Inventors: Yang Tian, Beijing (CN); Feng Li, Beijing (CN); Jingyue Nie, Beijing (CN); Lei Xiao, Beijing (CN); Huaisong Zhu, Beijing (CN)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 420 days.

(21) Appl. No.: 13/822,666

(22) PCT Filed: Sep. 21, 2010

(86) PCT No.: PCT/CN2010/001461
§ 371 (c)(1),
(2), (4) Date: Mar. 13, 2013

(87) PCT Pub. No.: WO2012/037704
PCT Pub. Date: Mar. 29, 2012

(65) Prior Publication Data
US 2013/0176997 A1    Jul. 11, 2013

(51) Int. Cl.
*H04J 3/06* (2006.01)
*H04W 56/00* (2009.01)
*H04W 36/02* (2009.01)
*H04W 92/04* (2009.01)

(52) U.S. Cl.
CPC .......... *H04W 56/001* (2013.01); *H04W 36/02* (2013.01); *H04W 56/005* (2013.01); *H04W 56/0085* (2013.01); *H04W 92/045* (2013.01)

(58) Field of Classification Search
None
See application file for complete search history.

(56) References Cited

U.S. PATENT DOCUMENTS

| | | | |
|---|---|---|---|
| 2004/0228338 A1 | 11/2004 | Sonning et al. | |
| 2006/0030322 A1* | 2/2006 | Kim et al. | 455/436 |
| 2006/0245398 A1* | 11/2006 | Li et al. | 370/335 |
| 2008/0318578 A1* | 12/2008 | Worrall | 455/437 |
| 2010/0150109 A1* | 6/2010 | Bradley et al. | 370/331 |
| 2011/0250887 A1* | 10/2011 | Tenny | 455/436 |
| 2012/0188986 A1 | 7/2012 | Kawasaki et al. | |

FOREIGN PATENT DOCUMENTS

| | | |
|---|---|---|
| CN | 1399825 A | 2/2003 |
| CN | 1735271 A | 2/2006 |
| CN | 1747598 A | 3/2006 |
| CN | 1747603 A | 3/2006 |
| CN | 101064561 A | 10/2007 |
| CN | 101513099 A | 8/2009 |

(Continued)

OTHER PUBLICATIONS

International Search Report mailed Jun. 9, 2011 in re International application No. PCT/CN2010/001461.

*Primary Examiner* — Jutai Kao
(74) *Attorney, Agent, or Firm* — Coats & Bennett, PLLC

(57) ABSTRACT

The invention discloses a timing synchronization method in a User Equipment (UE) which is served in a first cell of a first synchronous communication network and also located in a second cell of a second synchronous communication network. The method comprises receiving a message from a communication node of the first network, the message including clock offsets of the first cell and the second cell or timing difference there between, and calculating downlink synchronization of the second cell from downlink synchronization of the first cell and the clock offsets/timing difference.

19 Claims, 5 Drawing Sheets

(56) References Cited

FOREIGN PATENT DOCUMENTS

| WO | 200014907 | A1 | 3/2000 |
| WO | 200119338 | A1 | 11/2001 |
| WO | 03036837 | A1 | 5/2003 |
| WO | 2007149509 | A2 | 12/2007 |

* cited by examiner

AIR-INTERFACE TIMING SYNCHRONIZATION SHARING

TECHNICAL FIELD

The present invention generally relates to wireless communication, particularly to a timing synchronization method and a communication node for implementing the method.

BACKGROUND

Recently, different synchronous networks have been or are going to be deployed in many countries around the world, especially, TDD (Time Division Duplexing) networks, as typical synchronous network, have developed quickly. In some areas coexistence between two or more synchronous networks appears to be inevitable. For example, as one of the international 3G standards, Time Division-Synchronous Code Division Multiple Access (TD-SCDMA) standard has been widely deployed by China Mobile in China, and it is expected that Time Division-Long Term Evolution (TD-LTE), as an evolution of TD-SCDMA, will coexist with TD-SCDMA in future. Similarly, Personal Handyphone System (PHS) network and eXtended Global Platform (XGP) network may coexist in Japan; still, TD-LTE and Wimax networks may coexist in Southeast Asia. Interoperation between the coexisting TDD networks is a key feature to maintain session continuity.

Air-interface timing synchronization in both downlink and uplink is essential to TDD system. However, in the conventional solution for coexisting networks, timing synchronization information is not shared between networks. For example, a User Equipment (UE) that supports two coexisting different networks may wish to perform a cell handover or reselection from one network to another, as called an Inter-Radio Access Technology (IRAT) handover or reselection. The UE has already performs downlink and/or uplink timing synchronization with the source cell, but without the timing synchronization information, it has to redo the downlink and/or uplink timing synchronization with the target cell, which will increase control plane latency and user plane interruption time.

SUMMARY

Therefore, it is an object of the present invention to develop a solution which may reduce the latency and interruption for cell handover or reselection between two coexisting networks.

According to an aspect of the invention, the object is addressed by providing a timing synchronization method in a User Equipment (UE) which is served in a first cell of a first synchronous communication network and also located in a second cell of a second synchronous communication network. The method comprises receiving a message from a communication node of the first network, the message including clock offsets of the first cell and the second cell or timing difference therebetween, and calculating downlink synchronization of the second cell from downlink synchronization of the first cell and the clock offsets/timing difference.

The first synchronous communication network and the second synchronous communication network may be Time Division Multiplexing (TDD) networks, and may be selected from a group at least consisting of: Time Division-Synchronous Code Division Multiple Access (TD-SCDMA) network, Time Division-Long Term Evolution (TD-LTE) network, Personal Handyphone System (PHS) network, eXtended Global Platform (XGP) network, and Wimax network. The communication node may be selected from a group consisting of: Radio Network Controller (RNC), Node B, eNB, and base station. The message may be a System Information message or a UE-specific Radio Resource Control (RRC) message.

The method may further comprise detecting pilot signal of the second cell based on the calculated downlink synchronization. The method may further comprise downlink synchronizing to the second cell based on the calculated downlink synchronization. The method may further comprise calculating uplink synchronization of the second cell from uplink synchronization of the first cell and the clock offsets/timing difference. The method may further comprise uplink synchronizing to the second cell based on the calculated uplink synchronization. The method may further comprise reselecting/handovering to the second cell.

The downlink synchronization of the second cell may be calculated by $$DL\_SYNC\_Cell1 = DL\_SYNC\_Cell1 + \Delta t$$

where $$\Delta t = \text{offset}_2 - \text{offset}_1,$$

wherein DL_SYNC_Cell1 and DL_SYNC_Cell2 are respectively the downlink synchronization of the first cell and downlink synchronization of the second cell, $\Delta t$ is the timing difference between clock offsets of the second cell and the first cell, and $\text{offset}_1$ and $\text{offset}_2$ are respectively clock offsets in the first cell and the second cell relative to a common external clock.

The uplink synchronization of the second cell may be calculated by $$UL\_SYNC\_Cell2 = UL\_SYNC\_Cell1 + 2*OTD + \Delta t$$

where $$\Delta t = \text{offset}_2 - \text{offset}_1,$$

wherein UL_SYNC_Cell2 and UL_SYNC_Cell2 are respectively the uplink synchronization of the first cell and uplink synchronization of the second cell, OTD is Observed Time Difference of reception of frames from the first cell and the second cell, $\Delta t$ is the timing difference between clock offsets of the second cell and the first cell, and $\text{offset}_1$ and $\text{offset}_2$ are respectively clock offsets in the first cell and the second cell relative to a common external clock.

The message may further include a co-location indicator which indicate co-location relation of the first cell and the second cell, and the OTD is equal to zero if the co-location indicator indicates that the first cell and the second cell co-locates.

According to another aspect of the invention, the object is addressed by providing a timing synchronization method in a communication node of a first synchronous communication network, the communication node being adapted to serve a User Equipment (UE) in a first cell of the first synchronous communication network, the UE also being located in a second cell of a second synchronous communication network. The method comprise sending a message to the UE, the message including clock offsets of the first cell and the second cell or timing difference therebetween.

The first synchronous communication network and the second synchronous communication network may be Time Division Multiplexing (TDD) networks, and may be selected from a group at least consisting of: Time Division-Synchronous Code Division Multiple Access (TD-SCDMA) network, Time Division-Long Term Evolution (TD-LTE), Personal Handyphone System (PHS) network, eXtended Global Platform (XGP) network, and Wimax network. The communication node may be selected from a group at consisting of: Radio Network Controller (RNC), Node B, eNB, and base station. The message may be a System Information message or a UE-specific Radio Resource Control (RRC) message.

The method may further comprise reselecting/handovering the UE to the second cell.

The timing difference between clock offsets of the first cell and the second cell may be given by $$\Delta t = \text{offset}_2 - \text{offset}_1,$$

wherein $\Delta t$ is the timing difference between clock offsets of the first cell and the second cell, and $\text{offset}_1$ and $\text{offset}_2$ are respectively clock offsets in the first cell and the second cell relative to a common external clock.

The message may further include a co-location indicator which indicate co-location relation of the first cell and the second cell.

According to still another aspect of the invention, the object is addressed by providing a User Equipment (UE) which is adapted to be served in a first cell of a first synchronous communication network and also located in a second cell of a second synchronous communication network. The UE comprises a transceiver for receiving a message from a communication node of the first synchronous communication network, the message including clock offsets of the first cell and the second cell or timing difference therebetween, and a processing unit for calculating downlink synchronization of the second cell from downlink synchronization of the first cell and the clock offsets/timing difference.

According to still another aspect of the invention, the object is addressed by providing a communication node of a first synchronous communication network, the communication node being adapted to serve a User Equipment (UE) in a first cell of the first synchronous communication network, the UE also being located in a second cell of a second synchronous communication network. The communication node comprises a processing unit for generating a message, the message including clock offsets of the first cell and the second cell or timing difference therebetween, and a transceiver for sending the message to the UE.

According to still another aspect of the invention, the object is addressed by providing a synchronous communication network comprising a User Equipment (UE) and a communication node as describe above.

According to still another aspect of the invention, the object is addressed by providing A timing synchronization method in a User Equipment (UE), the UE being located in a first cell or a first carrier of a communication node. The method comprises during handover or reselection to a second cell or a second carrier of the communication node (220), downlink synchronizing to the second microcell or the second carrier using downlink synchronization of the first cell or the first carrier.

The method may further comprise uplink synchronizing to the second microcell or the second carrier using uplink synchronization of the first cell or the first carrier.

According to still another aspect of the invention, the object is addressed by providing a User Equipment (UE) comprising means for implementing the above method.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1:
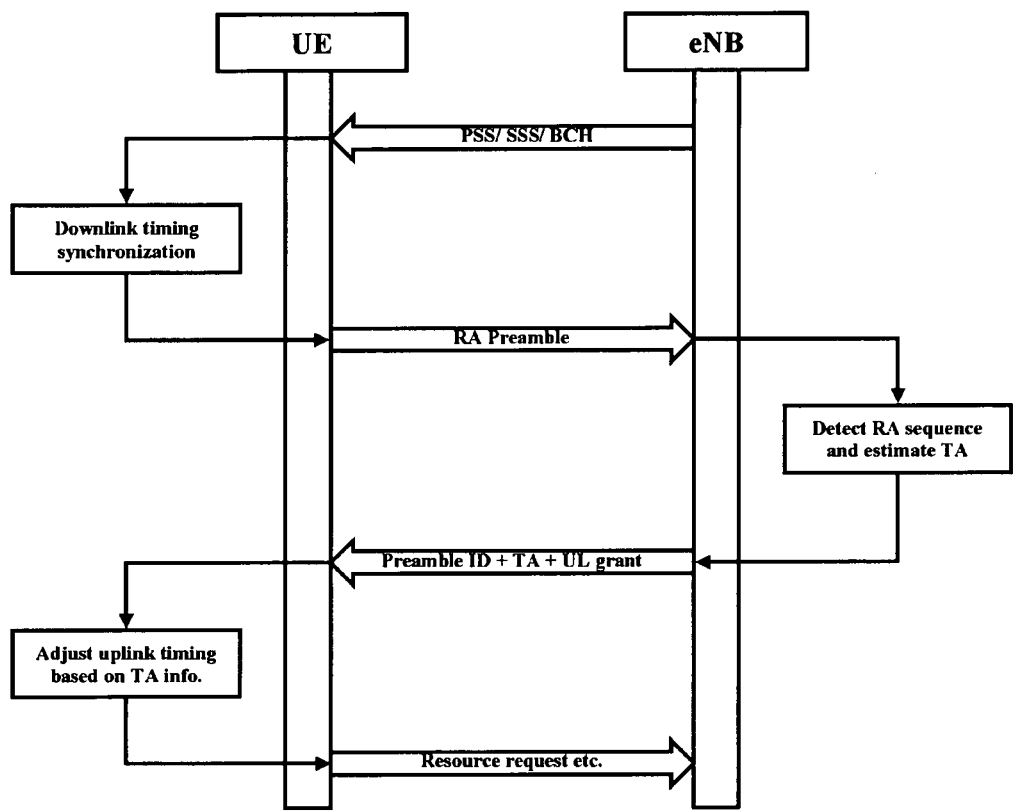
FIG. 1 shows a schematic procedure of initial timing synchronization in both downlink and uplink in a TD-LTE network.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus, networks (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The invention will be described in context of coexistence of TD-SCDMA and TD-LTE networks, however, it should be understood that the invention should not be limited to this, and can be applied to all the existing and future TDD systems. The specific terms such as evolved Node B (eNB), Node B (NB), Radio Network Controller (RNC) and User Equipment (UE) are used herein, but it should be understood that other terms may be used in different standards or protocols to refer to the same or like entities. It should be also understood that the invention may be applied to all type of handover/reselection, even handover/reselection between carriers of the same cell, although the invention is described in context of IRAT handover.

The invention will be described below with reference to the drawings.

Before starting to describe the inventive concept, it would be better to briefly introduce the conventional timing synchronization procedure. Taking an example of TD-LTE or TD-SCDMA, when a UE awakes from sleep mode, it first acquires downlink synchronization via a cell search procedure, and then acquires and maintains downlink synchronization in RRC_IDLE mode. If the UE initiates service or handover to a target cell, uplink synchronization needs to be acquired via contention or non-contention based Random Access (RA) procedure, and uplink synchronization should be maintained in RRC_CONNECTED mode via closed loop timing adjustment, known as Timing Advance (TA) in TD-LTE (3GPP TS 36.213) or Synchronization Shift (SS) in TD-SCDMA (3GPP TS 25.224).

A schematic procedure of initial timing synchronization in both downlink and uplink in a TD-LTE network are shown in FIG. 1. The downlink synchronization is achieved by a UE receiving the primary and secondary synchronization sequences (PSS/SSS) and the broadcast channel (BCH) from an evolved Node B (eNB). After acquiring downlink synchronization and receiving system information, the UE can perform the RA preamble transmission. Upon receiving the RA preamble, the eNB estimates and, if necessary, adjusts the UE uplink transmission timing, and sends a RA response indicating the successfully received preamble(s) along with the TA and uplink resource allocation information (shown as UL grant) to the UE. The UE then uses the TA information to adjust its uplink timing. After the UE has acquired uplink synchronization, it can send uplink scheduling information or a resource request using the resources indicated in the RA response.

During the connection in RRC_CONNECTED mode, uplink timing synchronization is maintained via timing advance command in MAC control element. There are similar timing synchronization mechanisms in TD-SCDMA.

Figure 2:
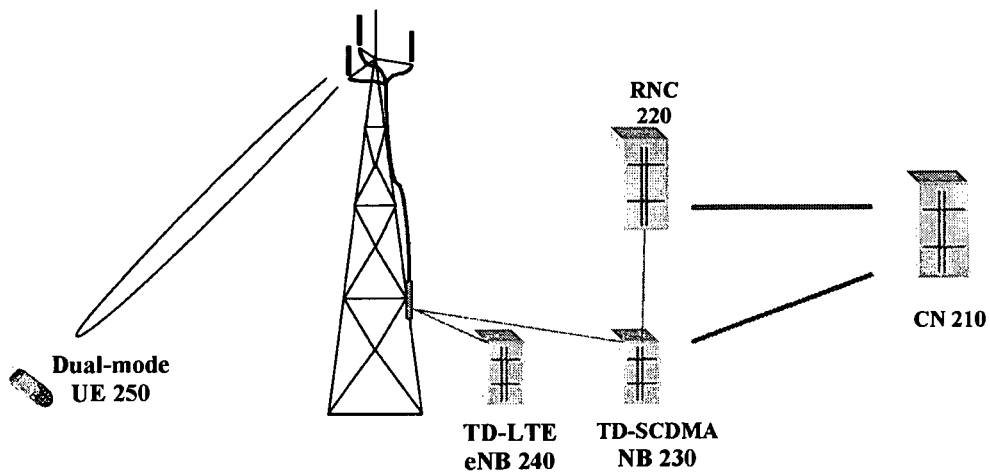
FIG. 2 is a schematic diagram illustrating an exemplary deployment of two coexisting networks.

FIG. 2 is a schematic diagram illustrating an exemplary deployment of coexisting networks. As shown in FIG. 2, a TD-SCDMA network may include a Core Network (CN) 210, a RNC 220 and a NB 230. A TD-LTE network coexists with the TD-SCDMA network, but for simplicity, only an eNB 240 is illustrated in FIG. 2. A dual-mode UE 250 that supports both TD-SCDMA and TD-LTE standards may communicate with either of the TD-SCDMA and TD-LTE networks via antennas as shared by the NB 230 and eNB 240. However, this example is illustrative only, and there are indeed many possible deployments of coexisting networks. For example, the networks may be any type of synchronous network, regardless FDD or TDD. The networks may be deployed to be collocated, or partly collocated. For example, the eNB 240 and NB 230, and the CNs for both networks may be deployed at the same or adjacent locations, for purpose of sharing as much network elements as possible and reducing deployment cost. However, it is also common that the networks are deployed in different locations without sharing any network elements, especially when the networks are run by different operators.

In some cases, the dual-mode UE 250 that is currently served by a cell of one network may handover to and/or reselect a cell of another network, as called Inter-Radio Access Technology (IRAT) cell handover/reselection. Suppose that the UE 250 is currently served by a serving cell (referred to hereinbelow as source cell) of the TD-SCDMA network, and is going to perform an IRAT handover to a cell (referred to hereinbelow as target cell) of the TD-LTE network, due to mobility or load sharing.

As we have discussed above, in the conventional solution for coexisting networks, timing synchronization information is not shared between networks, UE has to redo uplink timing synchronization for measurement based handover and redo both downlink and uplink timing synchronization for blind handover, which will increase control plane latency and user plane interruption time.

The same problem also exists in handover between carriers of the same TDD cell, handover or cell reselection between Hierarchical Cell Structures (HCS) cells of the same RAT, and IRAT cell reselection.

In order to reduce the latency caused by repeating uplink/downlink synchronization during handover/reselection, the invention proposes to obtain the timing synchronization of the target cell based on the timing synchronization of the origin cell without repeating the synchronization procedure.

Figure 3:
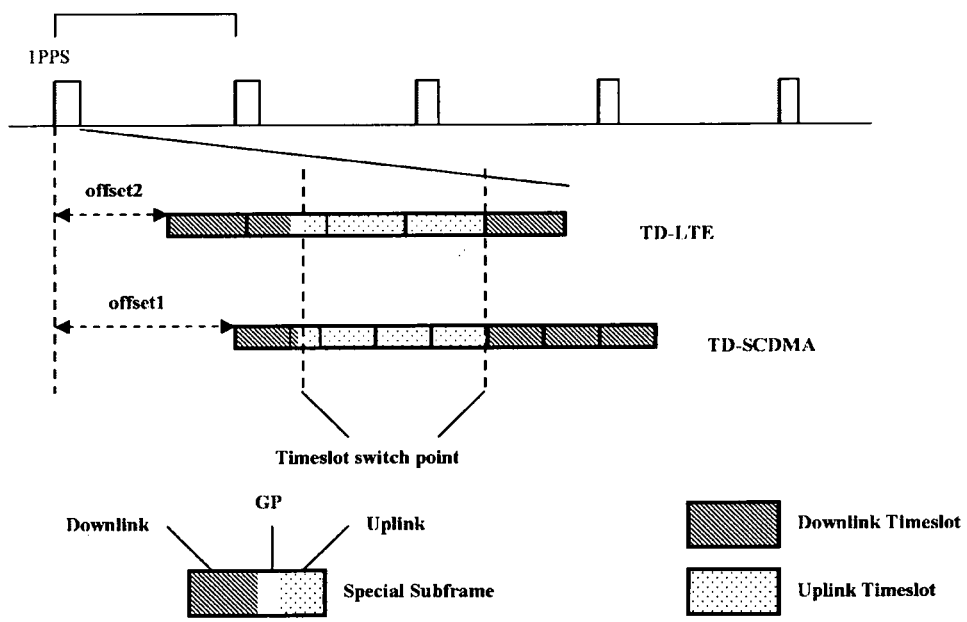
FIG. 3 exemplarily shows the principle of TD-LTE and TD-SCDMA frame alignment.

FIG. 3 exemplarily shows the principle of TD-LTE and TD-SCDMA frame alignment.

Both TD-LTE and TD-SCDMA adopt the same 5 ms repetition period of air-interface frames, referred to as half-frame for TD-LTE and sub-frame for TD-SCDMA respectively. Likewise, PHS/XGP and Wimax are also compatible with the 5 ms repetition period.

Typically, when deploying multiple TDD systems/networks in the same TDD band or adjacent TDD bands, the same external clock, such as GPS, is used. However, in order to avoid IRAT interference between two systems, the starts of radio frames are not aligned between two systems, but only timeslot switch points (i.e. the points at which downlink and uplink data transmission are switched) are aligned to keep transmission and reception simultaneously, which is also referred to as frame alignment scheme.

As shown in FIG. 3, TD-LTE and TD-SCDMA systems lock to 1 Pulse Per Second (PPS) clock source with different offsets to keep timeslot switch points aligned. Two pairs of aligned switch points separate the downlink data transmission and uplink data transmission respectively, and the first pair is located in a so-called special subframe wherein downlink and uplink data are spaced by a Guard Period (GP).

Apparently, the clock offsets of the TD-LTE and TD-SCDMA networks or cells can be preconfigured. It is possible that the two networks share the information on their clock offsets.

Suppose that the UE 250 is going to perform a handover from a TD-SCDMA cell (first cell) to a TD-LTE cell (second cell). In case that the TD-LTE and TD-SCDMA networks coexist, the downlink synchronization of the second cell can be calculated by:

$$DL\_SYNC\_Cell2 = DL\_SYNC\_Cell1 + \Delta t$$

where $$\Delta t = \text{offset}_2 - \text{offset}_1 \quad \text{Equation (1)}$$

wherein DL_SYNC_Cell1 and DL_SYNC_Cell2 are respectively the downlink synchronization of the first cell and downlink synchronization of the second cell, $\Delta t$ is the timing difference between clock offsets of the first cell and the second cell, and $\text{offset}_1$ and $\text{offset}_2$ are respectively clock offsets in the first cell and the second cell relative to a common external clock.

The above equation (1) holds for the case that the two networks collocate. For the case that the two networks coexist but are located at different positions, the DL_SYNC_CELL2 is not exactly equal to the sum of DL_SYNC_Cell1 and $\Delta t$, and there is a difference between both sides of the equation, which depends on the distance between antennas or (e)NBs of the two networks. However, due to the fact that the radius of the TD-SCDMA or TD-LTE cell is typically designed to be small, the distance between the antennas or (e)NBs of the two networks is relatively short. Thus, the equation (1) is deemed to hold for the later case.

The downlink synchronization of the first cell, i.e. the source cell, is already known to the UE. As can be seen from the above equation (1), the UE is able to calculate the downlink synchronization of the second cell, i.e., target cell, if it further knows the clock offsets of both the source cell and target cell, or the timing difference between the clock offsets.

Likewise, uplink synchronization can also be optimized. The UE may calculate the uplink synchronization of the second cell (target cell) by:

$$UL\_SYNC\_Cell2 = UL\_SYNC\_Cell1 + 2*OTD + \Delta t$$

where $$\Delta t = \text{offset}_2 - \text{offset}_1 \quad \text{Equation (2)}$$

wherein UL_SYNC_Cell2 and UL_SYNC_Cell2 are respectively the uplink synchronization of the first cell and uplink synchronization of the second cell. OTD is Observed Time Difference of reception of frames from the first cell and the second cell, and the measures for calculating OTD is also known in the art.

In case that the two networks collocate or more specifically, the antennas or (e)NBs of the two networks collocate, the distance between antennas or (e)NBs of the two networks is zero or almost neglectable as compared with the radio propagation distance between the (e)NBs and UE, therefore the OTD is equal or almost equal to zero. Then the above equation (2) may be further simplified as below:

$$UL\_SYNC\_Cell2 = UL\_SYNC\_Cell1 + \Delta t \quad \text{Equation (3)}$$

The invention proposes a synchronization mechanism to share the timing difference $\Delta t$ or offsets of the coexisting networks. Let's take the same example from above, i.e. the UE 250 that is currently served by the TD-SCDMA NB 230 (the first cell) is going to perform a handover to a cell of the TD-LTE eNB 240 (the second cell). The RNC 220 may notify the UE 250 of the timing difference $\Delta t$ or clock offsets of the two networks via System Information or UE-specific RRC messages. Then the UE 250 is able to calculate the downlink synchronization or the uplink synchronization of the second cell based on downlink synchronization or uplink synchronization of the first cell and the timing difference $\Delta t$ or clock offsets of the two networks.

Figure 4:
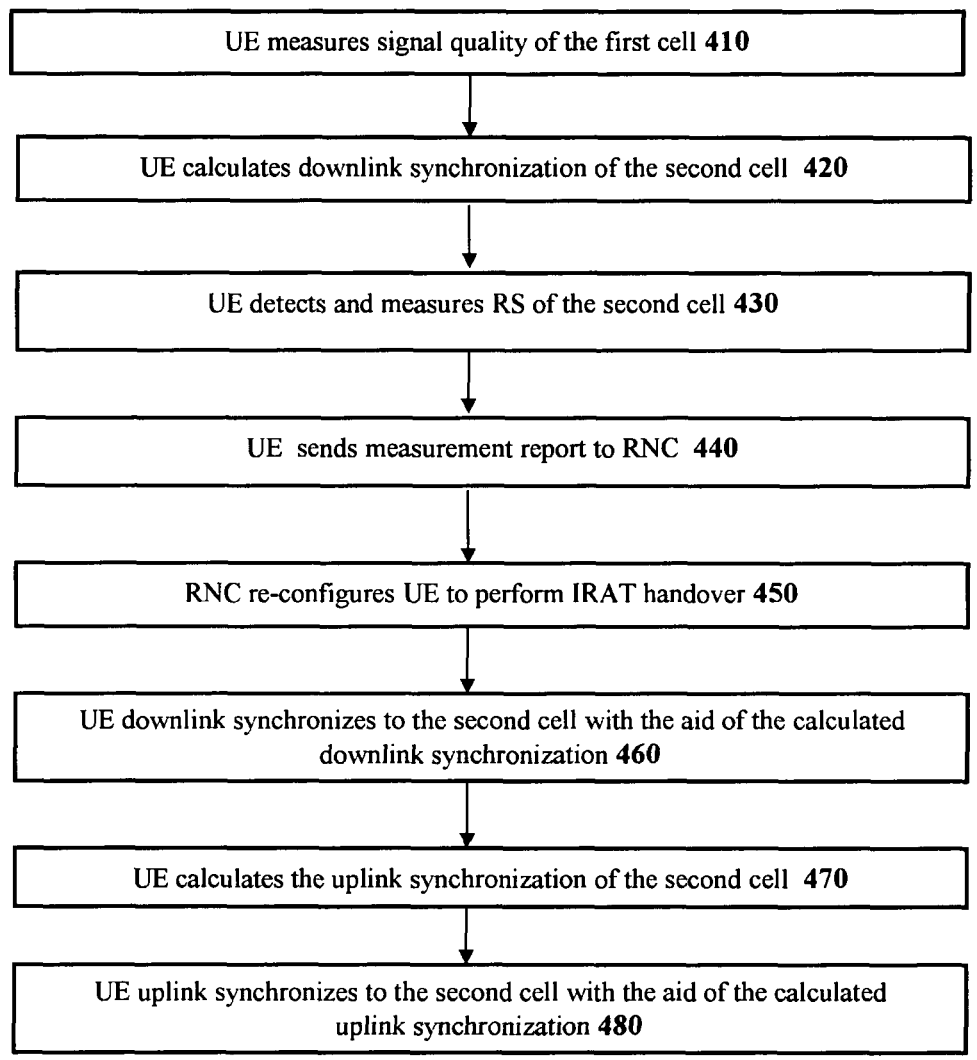
FIG. 4 illustrates a schematic procedure of an IRAT handover from TD-SCDMA to TD-LTE which adopts the synchronization mechanism according to an embodiment of the invention.

A schematic procedure of an IRAT handover from TD-SCDMA to TD-LTE which adopts the synchronization mechanism according to an embodiment of the invention is illustrated in FIG. 4.

The UE 250 is located in the first cell of the TD-SCDMA network to and the second cell of the TD-LTE network, but currently in traffic service by the TD-SCDMA NB 230 and TD-SCDMA RNC 220. It has already kept downlink and uplink synchronization with the first cell. The UE 250 needs to perform a handover to the second cell of the TD-LTE network, due to some reasons, for example, the signal degradation of the first cell (measurement-based handover) or relative high traffic load of the first cell (blind handover). Suppose that the UE 250 is going to perform a measurement-based handover. At step 410, the UE 250 measures signal quality of Primary Common Control Physical Channel (P-CCPCH) regarding the first cell. Then, the UE 250 measures signal quality of the second cell if the signal quality of the first cell is lower than a predetermined threshold. When attempting to measure the signal quality of the second cell, the UE 250 may first calculate at step 420 the downlink synchronization of the second cell of the TD-LTE network via the above equation (1), and then directly detect and measure at step 430 Reference Symbols (RS) of the second cell with the aid of the calculated downlink synchronization of the second cell. In particular, the UE 250 calculates the frame start of the second cell, and also knows RS position versus frame start, therefore UE may detect and measure RS directly. RS is designed as a pilot signal for downlink signal strength measurement and downlink channel quality estimation. At step 440, the UE 250 sends the measurement results of both cells to the RNC 220, for example, as an Information Element (IE) within a MEASUREMENT REPORT message, if the signal quality of the first cell is lower than that of the second cell. Then at step 450, the RNC 220 will send re-configuration to the UE 250 to perform an IRAT handover to the second cell after receiving the report. Then at step 460, the UE 250 downlink synchronizes to the second cell with the aid of the calculated downlink synchronization of the second cell. At step 470, the UE 250 calculates the uplink synchronization of the second cell via the above equation (2), and at step 480, uplink synchronizes to the second cell with the aid of the calculated uplink synchronization of the second cell. Once the handover is done, the UE 250 is served by the second cell. Please note that the above handover procedure is for illustrative purpose only, and does not show all the signallings as possibly involved in the handover. The signalling flows for IRAT handover will not be described in detail since they are well-known in the art and not related to the inventive concept of the invention.

The procedure for IRAT cell reselection is almost the same, except that the UE does not need the uplink synchronization of the second cell.

Figure 5:
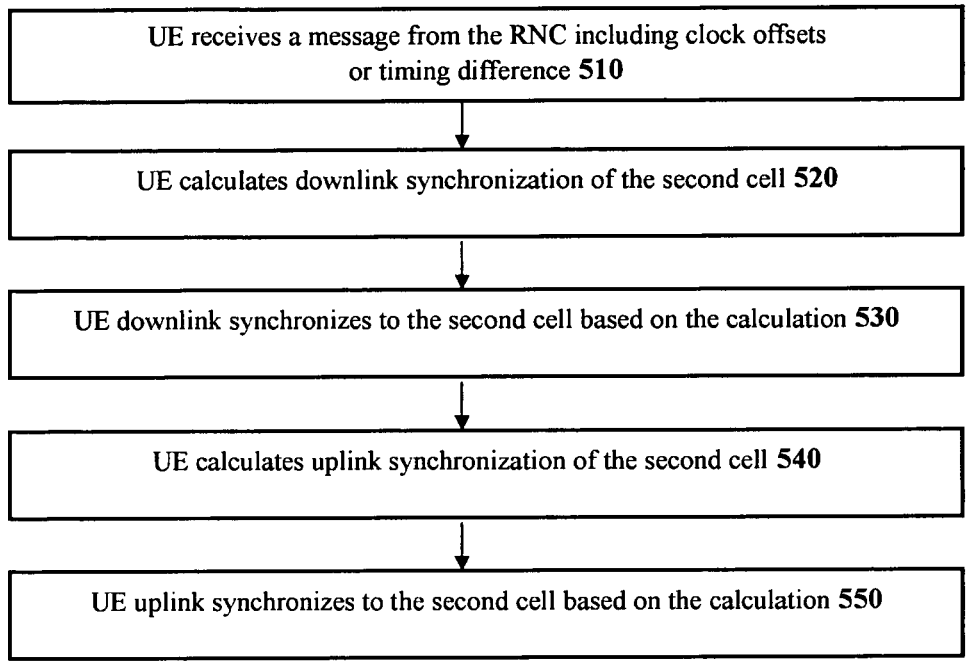
FIG. 5 is a schematic flow chart of the timing synchronization method at the UE according to an embodiment of the invention.

The timing synchronization method at the UE according to an embodiment of the invention will be discussed with reference to FIG. 5.

At step 510, the UE 250 which is served in the first cell of the TD-SCDMA network and also located in the second cell of the TD-LTE network receives a message from the RNC 220 of the TD-SCDMA network, the message including clock offsets of the first cell and the second cell or timing difference therebetween. At step 520, the UE 250 calculates downlink synchronization of the second cell from downlink synchronization of the first cell and the clock offsets/timing difference. The calculation may be based on the above equation (1). The downlink synchronization of the first cell is already known to the UE 250, and the method to calculate OTD is also known in the art. Thus, the UE 250 can calculate the downlink synchronization of the second cell as long as it extracts the clock offsets of the first cell and the second cell or the timing difference therebetween from the message. If the message includes the clock offsets of the first cell and the second cell, the UE 250 may obtain the timing difference by a subtraction operation. Then the UE 250 may downlink synchronize to the second cell based on the calculated downlink synchronization at step 530. With the clock offsets of the first cell and the second cell or the timing difference therebetween, the UE 250 can further calculate the uplink synchronization of the second cell from uplink synchronization of the first cell and the clock offsets/timing difference at step 540. The calculation may be based on the above equation (2). Then the UE 250 uplink synchronizes to the second cell based on the calculated uplink synchronization at step 550.

Figure 6:
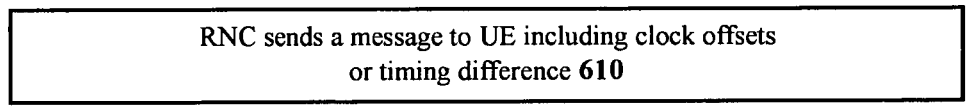
FIG. 6 is a schematic flow chart of the timing synchronization method at the RNC according to an embodiment of the invention.

The timing synchronization method at the RNC according to an embodiment of the invention will be discussed with reference to FIG. 6.

The RNC 220 of the TD-SCDMA network sends at step 610 a message to the UE, the message including clock offsets of the first cell and the second cell or timing difference therebetween. The message may be a System Information message or a UE-specific Radio Resource Control (RRC) message. The RNC 220 may include the clock offsets or timing difference as an IE into the message. The information on clock offsets or timing difference is known to the co-existing networks, and may be, for example, preconfigured on the RNC.

Although the RNC is shown as the communication node in the TD-SCDMA network that notifies the UE of the clock offsets or timing difference, it should be understand that in other type of communication nodes, for example, eNB in LTE, base stations in PHS, XGP and Wimax networks, may play the same role.

In an embodiment, the message as sent from the RNC 220 to the UE 250 may further include a co-location indicator which indicates co-location relation of the first cell and the second cell. For example, if the second cell collocates with the first cell, more specifically, the eNB 240 collocates with NB 230, the co-location indicator=TRUE, otherwise, the co-location indicator=FALSE. Depending on the number of adjacent cells, the message may include a table of co-location indicators to indicate the co-location relations for all the adjacent cells. If the co-location indicator indicates the second cell collocates with the first cell, the calculation of uplink synchronization of the second cell can be based on the above equation (3), i.e. the OTD is omitted.

It should be understood that the above timing synchronization method can be applied to all the synchronous networks, not limited to TDD networks. Each synchronous network has a clock offset relative to the common external clock such as GPS. In case of IRAT handover or cell reselection, the synchronization procedure can be simplified by informing the UE of the clock offsets or the timing difference therebetween.

The inventive timing synchronization can not only be applied to IRAT handover or cell reselection, but also to handover between carriers of the same TDD cell, handover or cell reselection between HCS cells of the same RAT. In these cases, the timing difference Δt between two carriers or HCS cells is zero, since the carriers or HCS cells have the same clock offsets. Thus, the above equations (1) and (3) can be further simplified, i.e., the downlink synchronization of the new carrier or HCS cell is the same as that of the original carrier or HCS cell, and the uplink synchronization of the new carrier or HCS cell is also the same as that of the original one. Therefore, the UE may directly synchronize to the new carrier or HCS cell using the previous downlink and uplink synchronization.

Figure 7:
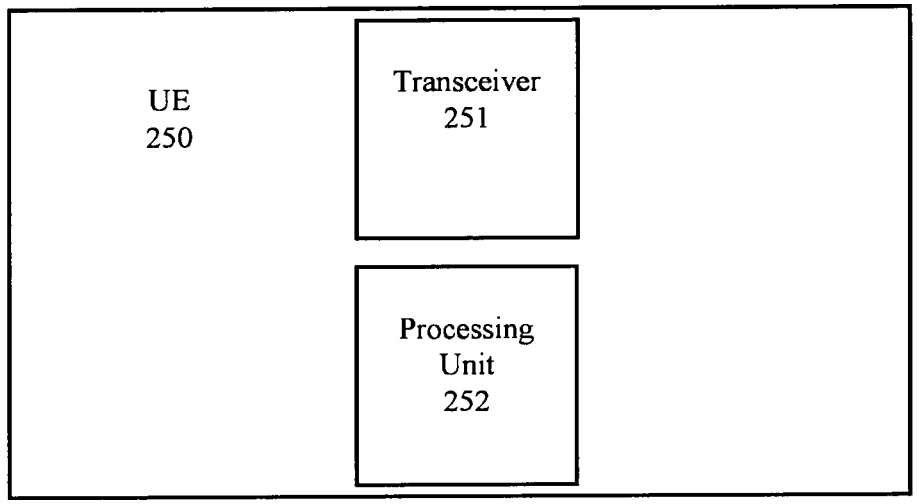
FIG. 7 is a schematic block diagram of the UE according to an embodiment of the present invention.

FIG. 7 is a schematic block diagram of the UE according to an embodiment of the present invention.

The UE 250 comprises a transceiver 251 for receiving a message from the TD-SCDMA network, the message including clock offsets of the first cell and the second cell or timing difference therebetween. The UE 250 further comprises a processing unit 252 for calculating downlink synchronization of the second cell from downlink synchronization of the first cell and the clock offsets/timing difference. The processing unit 252 may detect pilot signal of the second cell based on the calculated downlink synchronization as discussed above, and downlink synchronize to the second cell based on the calculated downlink synchronization. The processing unit 252 may calculate uplink synchronization of the second cell from uplink synchronization of the first cell and the clock offsets/timing difference, and uplink synchronize to the second cell based on the calculated uplink synchronization. The processing unit 252 may reselect/handover the UE 250 to the second cell.

It should be apparent that the UE 250 may comprise other conventional parts which are not shown for sake of clarity.

Figure 8:
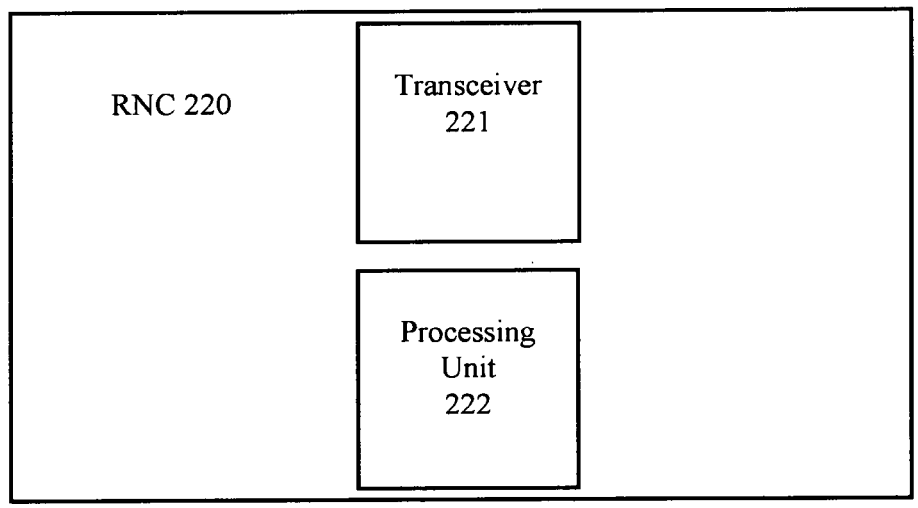
FIG. 8 is a schematic block diagram of the RNC according to an embodiment of the present invention.

FIG. 8 is a schematic block diagram of the RNC according to an embodiment of the present invention.

The RNC 220 of the TD-SCDMA network comprises a processing unit 222 for generating a message, the message including clock offsets of the first cell and the second cell or timing difference there between. It further comprises a transceiver 221 for sending the message to the UE 250. The processing unit 222 may be operative to reselect/handover the UE 250 to the second cell.

If the timing difference between clock offsets of the first cell and the second cell is to be included in the message, the processing unit 222 may calculate the timing difference by $$\Delta t = \text{offset}_2 - \text{offset}_1.$$

With the timing synchronization as described above, both the downlink and uplink synchronization procedure can be simplified. During handover/reselection, the UE can quickly detect and measure the pilot signal of the second cell with the aid of the calculated downlink synchronization of the target cell, as discussed above. The UE may be required to read system information of target cell, such as ECGI (Evolved Cell Global Identifier). With the calculated downlink synchronization of the second cell, the UE can find System Information-Radio Network Temporary Identifier (SI-RNTI) in Packet Data Control Channel (PDCCH) at proper timing and directly read system information. Thus, the measurement time is reduced.

Also, with the downlink and uplink synchronization information, the time as required for synchronization procedure can be saved. The control plane latency and user plane interruption time during handover can be reduced, especially for blind handover. Similarly, the cell reselection latency can be reduced.

In addition, collision possibility of Preamble (TD-LTE) or SYNC_UL (TD-SCDMA) which is used for uplink synchronization is reduced. Reconfiguration success rate in one cell, such as security key change in TD-LTE or carrier adjustment triggered by radio resource management in TD-SCDMA, can be increased.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention not be limited to the particular embodiment disclosed as the best mode contemplated for carrying out the present invention, but that the present invention include all embodiments falling within the scope of the appended claims.

The invention claimed is:

1. A timing synchronization method in a User Equipment (UE) which is served in a first cell of a first synchronous communication network and also located in a second cell of a second synchronous communication network, the method comprising:
receiving a message from a communication node of the first network, the message including clock offsets of the first cell and the second cell or timing difference $\Delta t$ therebetween; and
calculating downlink synchronization of the second cell from downlink synchronization of the first cell and the clock offsets/timing difference;
wherein the uplink synchronization of the second cell is calculated by the following formula:

$$UL\_SYNC\_Cell2 = UL\_SYNC\_Cell1 + 2*OTD + \Delta t$$

where:
UL_SYNC_Cell1 is the uplink synchronization of the first cell;
UL_SYNC_Cell2 is the uplink synchronization of the second cell;
OTD is an observed time difference of reception of frames from the first cell and the second cell;
$\Delta t$=offset2−offset1;
offset1 and offset2 are clock offsets in the first cell and the second cell, respectively, relative to a common external clock.

2. The method of claim 1, wherein the message is a System Information message or a UE-specific Radio Resource Control message.

3. The method of claim 1, further comprising detecting a pilot signal of the second cell based on the calculated downlink synchronization.

4. The method of claim 1, further comprising downlink synchronizing to the second cell based on the calculated downlink synchronization.

5. The method of claim 1, further comprising:
calculating uplink synchronization of the second cell from an uplink synchronization of the first cell and the clock offsets/timing difference;
uplink synchronizing to the second cell based on the calculated uplink synchronization.

6. The method of claim 1:
wherein the message further includes a co-location indicator which indicates a co-location relation of the first cell and the second cell;
wherein OTD is equal to zero if the co-location indicator indicates that the first cell and the second cell are co-located.

7. A timing synchronization method in a User Equipment (UE) which is served in a first cell of a first synchronous communication network and also located in a second cell of a second synchronous communication network, the method comprising:
receiving a message from a communication node of the first network, the message including clock offsets of the first cell and the second cell or timing difference $\Delta t$ therebetween; and
calculating downlink synchronization of the second cell from downlink synchronization of the first cell and the clock offsets/timing difference;
wherein the downlink synchronization of the second cell is calculated by the following formula:

$$DL\_SYNC\_Cell2 = DL\_SYNC\_Cell1 + \Delta t$$

where:
DL_SYNC_Cell1 is the downlink synchronization of the first cell;
DL_SYNC_Cell2 is the downlink synchronization of the second cell;
$\Delta t$=offset2−offset1;
offset1 and offset2 are clock offsets in the first cell and the second cell, respectively, relative to a common external clock.

8. The method of claim 7, wherein the message is a System Information message or a UE-specific Radio Resource Control message.

9. The method of claim 7, further comprising detecting a pilot signal of the second cell based on the calculated downlink synchronization.

10. The method of claim 7, further comprising downlink synchronizing to the second cell based on the calculated downlink synchronization.

11. The method of claim 7, further comprising:
calculating uplink synchronization of the second cell from an uplink synchronization of the first cell and the clock offsets/timing difference;
uplink synchronizing to the second cell based on the calculated uplink synchronization.

12. The method of claim 7, wherein the message further includes a co-location indicator which indicates a co-location relation of the first cell and the second cell.

13. A User Equipment (UE) which is configured to be served in a first cell of a first synchronous communication network, the UE also located in a second cell of a second synchronous communication network, the UE comprising:
a transceiver configured to receive a message from a communication node of the first synchronous communication network, the message including clock offsets of the first cell and the second cell or timing difference $\Delta t$ therebetween; and
a processing circuit configured to calculate downlink synchronization of the second cell from downlink synchronization of the first cell and the clock offsets/timing difference;
wherein the processing circuit is adapted to calculate the uplink synchronization of the second cell by the following formula:

$$UL\_SYNC\_Cell2 = UL\_SYNC\_Cell1 + 2*OTD + \Delta t$$

where:
UL_SYNC_Cell1 is the uplink synchronization of the first cell;
UL_SYNC_Cell2 is the uplink synchronization of the second cell;

OTD is an observed time difference of reception of frames from the first cell and the second cell;

$\Delta t$=offset2−offset1;

offset1 and offset2 are clock offsets in the first cell and the second cell, respectively, relative to a common external clock.

14. The UE of claim 13, wherein the message is a System Information message or a UE-specific Radio Resource Control message.

15. The UE of claim 13, wherein the processing circuit is configured to detect a pilot signal of the second cell based on the calculated downlink synchronization.

16. The UE of claim 13, wherein the processing circuit is configured to downlink synchronize to the second cell based on the calculated downlink synchronization.

17. The UE of claim 13, wherein the processing circuit is configured to:
- calculate uplink synchronization of the second cell from uplink synchronization of the first cell and the clock offsets/timing difference;
- uplink synchronize to the second cell based on the calculated uplink synchronization.

18. The UE of claim 13:
- wherein the message further includes a co-location indicator which indicates a co-location relation of the first cell and the second cell;
- wherein OTD is equal to zero if the co-location indicator indicates that the first cell and the second cell are co-located.

19. A User Equipment (UE) which is configured to be served in a first cell of a first synchronous communication network, the UE also located in a second cell of a second synchronous communication network, the UE comprising:
- a transceiver configured to receive a message from a communication node of the first synchronous communication network, the message including clock offsets of the first cell and the second cell or timing difference $\Delta t$ therebetween; and
- a processing circuit configured to calculate downlink synchronization of the second cell from downlink synchronization of the first cell and the clock offsets/timing difference;

wherein the processing circuit is configured to calculate the downlink synchronization of the second cell using the following formula:

$$DL\_SYNC\_Cell2 = DL\_SYNC\_Cell1 + \Delta t$$

where:

DL_SYNC_Cell1 is the downlink synchronization of the first cell;

DL_SYNC_Cell2 is the downlink synchronization of the second cell;

$\Delta t$=offset2−offset1;

offset1 and offset2 are clock offsets in the first cell and the second cell, respectively, relative to a common external clock.

* * * * *

UNITED STATES PATENT AND TRADEMARK OFFICE
CERTIFICATE OF CORRECTION

PATENT NO. : 9,215,679 B2  
APPLICATION NO. : 13/822666  
DATED : December 15, 2015  
INVENTOR(S) : Tian et al.

It is certified that error appears in the above-identified patent and that said Letters Patent is hereby corrected as shown below:

IN THE SPECIFICATION

In Column 2, Line 21, delete "DL_SYNC_Cell1" and insert -- DL_SYNC_Cell2 --, therefor.

In Column 8, Line 14, delete "to and" and insert -- and --, therefor.

In Column 9, Lines 32-36, delete "Radio Resource...........the RNC." and insert the same at Line 31, after "UE-specific", as a continuation Paragraph.

Signed and Sealed this  
Fifth Day of April, 2016

Michelle K. Lee  
*Director of the United States Patent and Trademark Office*